(No Model.)

J. B. & W. HEIGHINGTON.
VALVE HANDLE.

No. 447,684. Patented Mar. 3, 1891.

Witnesses
Charles Priestman
H Riches

Inventor
John B. & William Heighington
Per Graham & Riches.
Attorneys.

UNITED STATES PATENT OFFICE.

JOHN B. HEIGHINGTON AND WILLIAM HEIGHINGTON, OF TORONTO, CANADA, ASSIGNORS TO JOSEPH HEIGHINGTON AND MELVILLE FITCH BROWN, BOTH OF SAME PLACE.

VALVE-HANDLE.

SPECIFICATION forming part of Letters Patent No. 447,684, dated March 3, 1891.

Application filed October 22, 1889. Serial No. 327,855. (No model.) Patented in Canada November 12, 1889, No. 32,804.

*To all whom it may concern:*

Be it known that we, JOHN BREARLY HEIGHINGTON and WILLIAM HEIGHINGTON, pattern-makers, of the city of Toronto, in the county of York, in the Province of Ontario, Canada, have invented certain new and useful Improvements in Valve-Handles; and we hereby declare that the following is a full, clear, and exact description of the same.

The object of the invention is to make a strong and cheaply-constructed handle for valves, tallow-cups, steam-gages, and all similar appliances that will act as a non-conductor of heat and cold; and it consists in the improved construction and combination of parts, as hereinafter more fully described in the specification, and set forth in the claim.

To prevent the rubber ring from slipping around the periphery of the disk when a greater force than usual is required to turn the handle, we corrugate the periphery of the disk and the channel of the rubber ring, and the corrugations meshing both the ring and the disk are obliged to move simultaneously.

Figure 1:
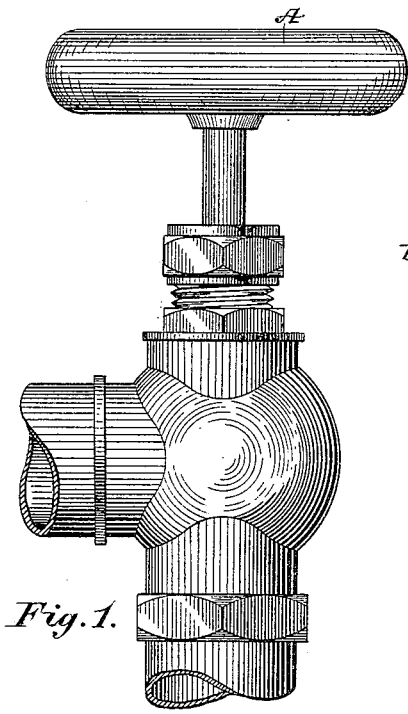
Figure 3:
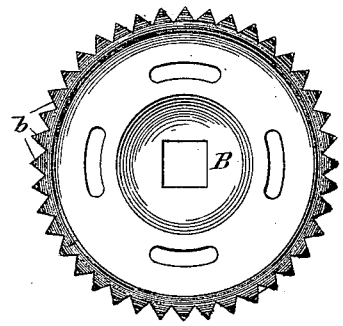
Figure 4:
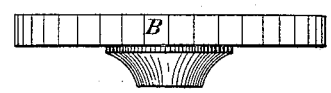
Figure 2:
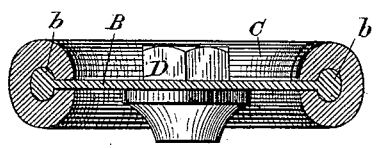
Figure 5:
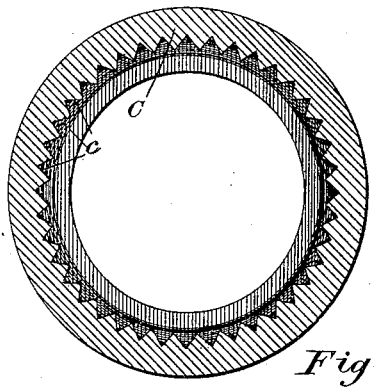

In the drawings, Figure 1 is an elevation of a globe-valve, showing our handle applied. Fig. 2 is a sectional view showing the arrangement and construction of the rubber ring and disk. Fig. 3 is a plan view of the disk. Fig. 4 is an elevation of the disk. Fig. 5 is a section of the rubber ring.

Like letters of reference refer to like parts throughout the specification and drawings.

A is our improved handle for valves, tallow-cups, steam-gages, and all similar appliances, consisting of a metallic disk B, having a corrugated flanged edge $b$, which is incased in an annular ring C of rubber or other suitable non-conducting material. This ring C has a corrugated groove or channel $c$, formed to correspond with the flanged edge $b$ of the disk B. The object of this corrugated flanged edge $b$ and corrugated groove $c$ is to prevent the ring C slipping around the periphery of or being separated from the disk B when a greater force than usual is applied to turn the handle. The ring C is removable from the disk B, so that if the rubber is burned it can be removed and replaced by another without removing the handle A from the valve-stem.

It will be noticed that the nut D on the upper face of the disk B is slightly below the level of the top of the ring C, it being arranged thus, so that when the handle is taken hold of the hand runs no risk of being burned by coming in contact with any portion of the metal forming part of the handle A, which is heated to a temperature proportionate to the length of the stem and the temperature of the valve.

It will be seen from the foregoing specifications and drawings that the ring C, composed of rubber or other suitable material that is a non-conductor of heat and is always at a mean temperature of about 55° Fahrenheit, forms the grip, and is the only thing that the hand comes in contact with.

Having thus fully described our invention, what we claim as new, and desire to secure by Letters Patent, is—

The combination of the metallic disk B, having corrugated flanged edge $b$, with the annular ring C, of rubber or other suitable non-conducting material, having a corrugated channel $c$, formed to fit the corrugated flanged edge $b$ of the disk B, substantially as and for the purpose set forth.

Toronto, September 27, 1889.

JOHN B. HEIGHINGTON.
WILLIAM HEIGHINGTON.

In presence of—
CUSTAV A. PRIEST,
CHARLES PRIESTMAN.